US006769659B1

(12) United States Patent
Martello

(10) Patent No.: US 6,769,659 B1
(45) Date of Patent: Aug. 3, 2004

(54) BOTTLE BRACKET

(76) Inventor: Gilbert A. Martello, 2900 Rockefeller Rd., Willoughby Hills, OH (US) 44092

( * ) Notice: Subject to any disclaimer, the term of this patent is extended or adjusted under 35 U.S.C. 154(b) by 0 days.

(21) Appl. No.: 10/462,446

(22) Filed: Jun. 16, 2003

Related U.S. Application Data

(60) Provisional application No. 60/389,608, filed on Jun. 18, 2002.

(51) Int. Cl.[7] ................................................ A47K 1/08
(52) U.S. Cl. ................. 248/311.2; 248/154; 248/205.2; 248/313
(58) Field of Search ................................ 248/154, 313, 248/500, 503, 510, 311.2, 309.1, 205.2, 220.1, 220.21, 225.11, 216.1, 229.17, 228.8, 230.8

(56) References Cited

U.S. PATENT DOCUMENTS

| 3,141,642 | A | * | 7/1964 | Mayrath .................... 248/74.3 |
| 4,444,358 | A | * | 4/1984 | Spohn et al. ............ 239/284.1 |
| 5,607,133 | A | * | 3/1997 | Markham et al. ........... 248/313 |
| 5,632,461 | A | * | 5/1997 | von Helms et al. ...... 248/218.4 |
| 6,033,560 | A | * | 3/2000 | Kisner ......................... 210/169 |
| 6,129,078 | A | * | 10/2000 | Moulder ...................... 126/40 |
| 6,220,557 | B1 | * | 4/2001 | Ziaylek et al. ........... 248/316.1 |
| 6,340,143 | B1 | * | 1/2002 | McCraney .................. 248/154 |

* cited by examiner

Primary Examiner—Ramon O Ramirez
(74) Attorney, Agent, or Firm—Renner, Kenner, Greive, Bobak, Taylor & Weber

(57) ABSTRACT

A bracket for securing an object such as a bottle within a vehicle, the bracket including a body that attaches to the vehicle and one or more straps associated with the body to secure the bottle to the bracket body.

16 Claims, 2 Drawing Sheets

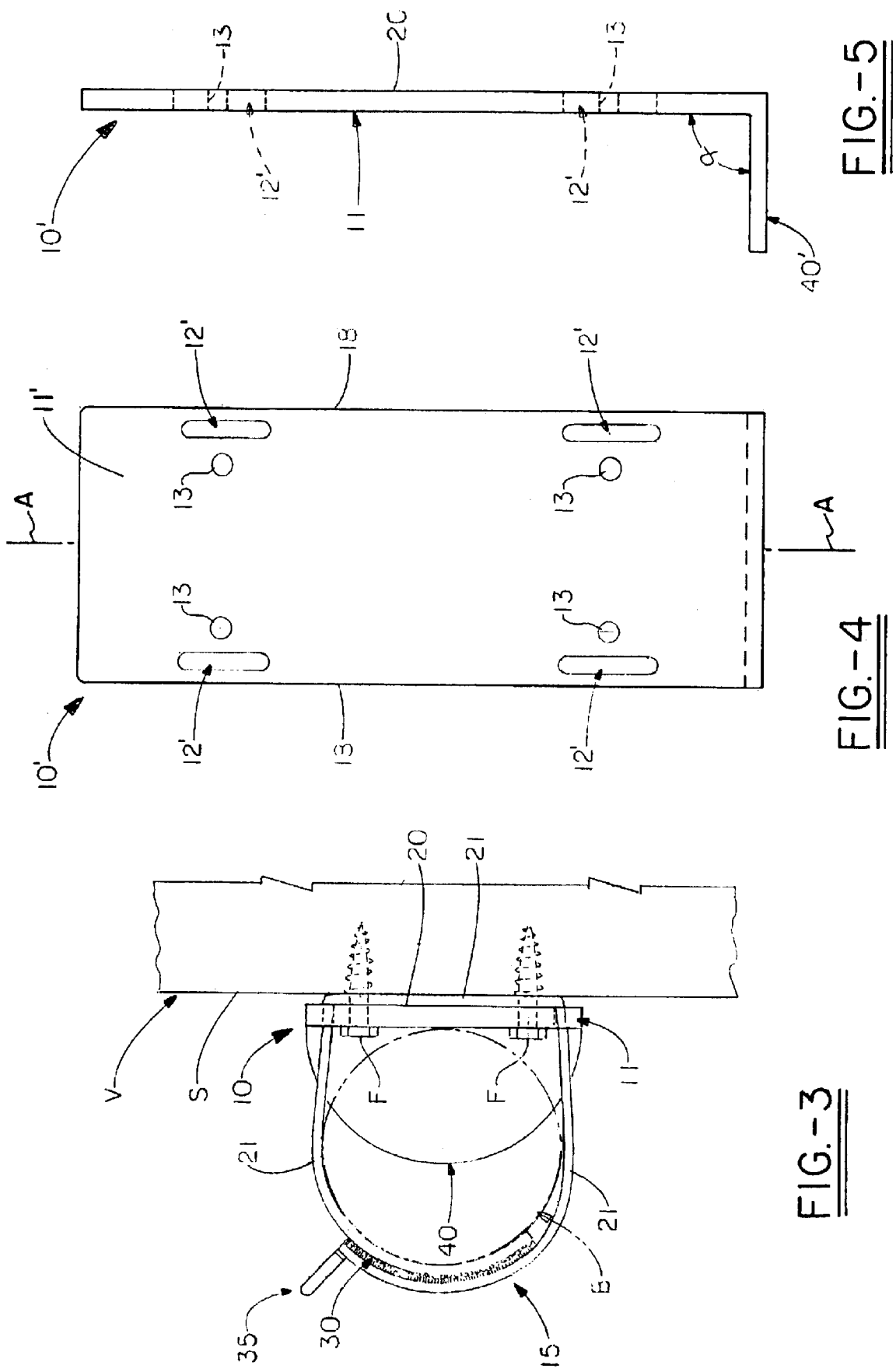

BOTTLE BRACKET

This application claims benefit of Ser. No. 60/389,608 filed Jun. 18, 2002.

SUMMARY OF THE INVENTION

The present invention generally provides a bracket useful in mounting objects, within a vehicle.

The present invention further provides a bottle bracket constructed of a material that is relatively brittle, when compared to metal, such as for example, a plastic material, the bracket having a strap for securing the bottle to the bracket where a portion of the strap is located between the bracket body and a surface of a vehicle to which the bracket is to be mounted, and fasteners driven through the body and strap into a vehicle to mount the bracket thereon.

The present invention further provides a bottle bracket for securing a bottle in a vehicle including at least two straps associated with the bracket to secure the body thereto and a handle graspable by a user and attached to each of the straps, whereby the user may release all of the straps by pulling on the handle.

The present invention still further provides a bracket for supporting a bottle within a vehicle, the bracket including a body attachable to the vehicle, a first strap and a second strap, each of the straps having ends releasably attached to their respective straps, and a handle attached to both of the straps for releasing both of the straps with a single pull.

The present invention further provides a method of mounting a bracket to a vehicle including the steps of: providing a bracket having a body with a strap for releasably attaching a bottle to the bracket body, positioning at least a portion of the strap between the body and a surface of the vehicle on which the bracket is to be supported, and driving fasteners through the body, then the strap, and finally into said surface to attach the body to the vehicle.

BRIEF DESCRIPTION OF THE DRAWINGS

FIG. 3 is a top view of the assembly shown in FIG. 2;

FIG. 4 is a rear elevational view of an alternative bottle bracket according to the concepts of the present invention; and FIG. 5 is a side elevational view of the bottle bracket depicted in FIG. 3.

DETAILED DESCRIPTION OF THE INVENTION

The present invention generally relates to an apparatus and method or securing objects within a vehicle. More particularly, the present invention relates to an apparatus that is used to secure "bottles." The term "bottles" is used herein to generally refer to objects to be secured within a vehicle V including, for example, containers, for example, beverage bottles, tubes, cans, and fire extinguishers, all of which will be collectively referred to by the term "bottles." Further, it will be appreciated that other objects may be secured within a vehicle by a bracket according to the concepts of the present invention and, therefore, the present invention is not limited to the particular examples noted above and described within the application.

As mentioned, the bottle bracket, generally indicated by the numeral 10, according to the concepts of the present invention may be used in connection with a vehicle V. For purposes of illustration only, reference will be made to boating vehicles as one example of a useful application for the bottle bracket 10. Reference to this example is in no way limiting of the present invention. In vehicles, and, in particular, in boating, it may be necessary to secure a bottle B within the confines of the vehicle V. In boating, known designs incorporate a bracket which is screwed to a surface within a boat. Attempts have been made to construct this bracket of plastic, but the jarring forces of the boat traveling across the uneven surface of a body of water caused the screws to fracture or otherwise damage or deform the plastic bracket to the point that it could no longer be supported on the vehicle V. To that end, metal brackets have been used to ensure that such fracture will not occur. Since it is desirable to use the less expensive plastic material, which also has less weight than its metal counterpart, present invention may be adapted to prevent the fracture of the bracket. For purposes of this description, it will be understood that reference to a "brittle" material is one that is more likely to fracture or deform than steel.

Figure 2:
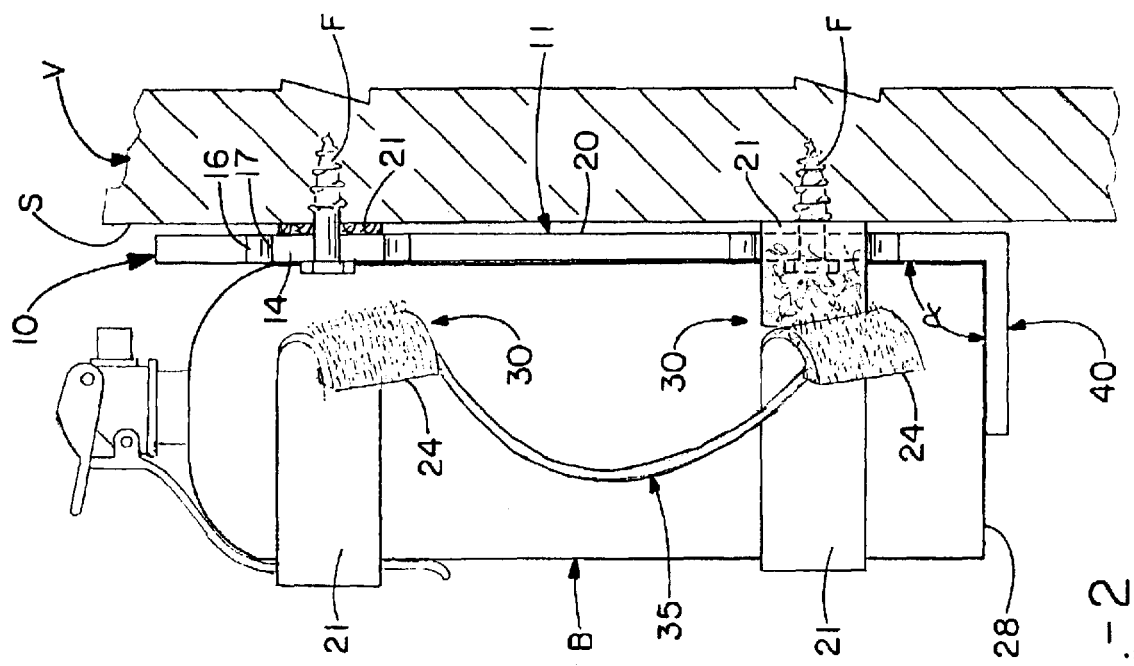
FIG. 2 is a left side elevational view of a bottle bracket according to the concepts of the present invention shown attached to a supporting surface and holding a bottle.
Figure 1:
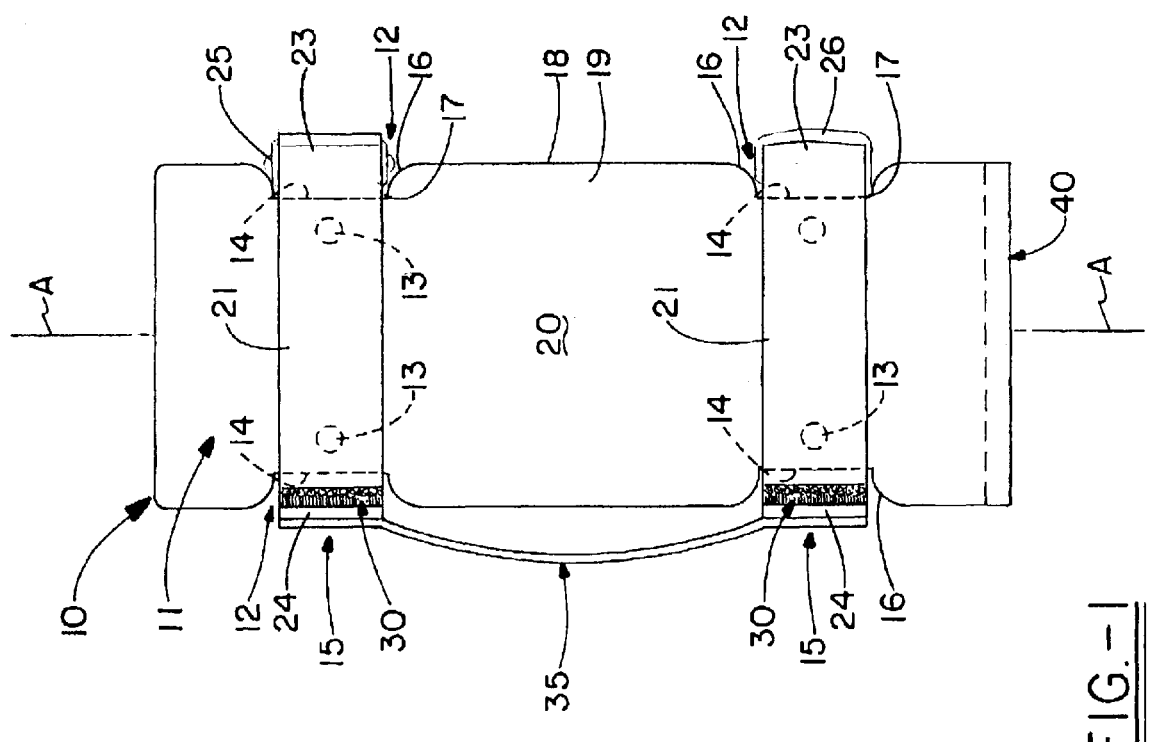
FIG. 1 is a rear elevational view of a bottle bracket according to the concepts of the present invention.

To that end, and with reference to FIGS. 1–3, bottle bracket 10 includes a generally bracket body 11, which may be planar, that attaches to a supporting surface S in the vehicle V. A body 11 may be constructed of any material including wood, metal, plastic, or elastomeric materials. As mentioned, it is desirable to use plastic over metal due to costs. Despite this, according to some aspects of the present invention, bracket body 11 may be constructed of any material including those discussed above.

The body 11 is generally mounted on the vehicle V by fasteners F, which may be driven through the body 11, or body 11 may be provided with receivers 13 adapted to allow the passage of fasteners F through the body 11 of the bracket 10. Body 11 may further provided with securement assembly receivers 12, which may be in the form of slot 12' (shown in the FIG. 4) or notches 12 (shown in FIG. 1) that open laterally outwardly of the body 11. The notches 12, as shown in FIG. 1, may have a generally planar interior surface running substantially parallel to axis A of body 11 with a sidewall 16 that extends laterally outwardly from the vertical extremities 17 of interior surface 14. It will be appreciated that the sidewall 16 of notch 12 may extend in a linear or nonlinear manner (as shown). In the example shown, sidewalls 16 are arcuate and curve axially and laterally outward from the interior surface 14 to form a notch 12 having an inwardly tapering profile. In the example shown, the notches 12 are axially spaced by intermediate body portions 19 that extend laterally outward to the side edge 18 of the body 11.

A securement assembly, generally indicated by the numeral 15 is received within the notches 12. In the embodiment shown, securement assembly 15 includes at least one strap 21 that extends around the rear surface 20 of body 11, such that a portion of the strap 21 is located between the surface S to which the bracket 10 is being attached and the back 20, as best shown in FIGS. 2 and 3. The fastener F used to attach the bottle bracket 10 to the supporting surface S of vehicle V is driven through the strap 21 before entering the supporting surface S. In this way, the strap 21 provides shock absorption and prevents damage to the bracket body 11, resulting from any jarring of the vehicle V. The strap 21 may be made of a variety of materials, including natural materials, for example, leather or natural fibers; polymeric materials, for example, nylon; or elastomeric materials, for example, rubber.

The strap 21 also serves to secure the bottle B to the bracket 10. In the example shown, given the length of the bottle B, two straps 21, 21 are used to secure the bottle B. For simplicity, the description will proceed with reference to only a single strap 21. Strap 21 has a first end 23 and a second end 24, the ends 23 and 24 are securable to hold the bottle B against the bracket 10. In the example shown, the strap 21 is provided with a strap adjustment assembly, generally indicated by the numeral 25 to adjust the relative length of the strap 21 to ensure a snug fit for the bottle B. In the example shown, a buckle 26 is used as the adjustment assembly 25. The buckle 26 provides the user with the means to adjust the relative length of the strap 21. It will be appreciated that other similar items, such as double D-loops, D-loops, or clips may be used in the same manner. Alternatively, the length of the strap may be adjusted by adjusting the overlap of the second end 24 relative to the strap 21.

As depicted in FIG. 1, an adjustable fastening assembly, generally indicated by the numeral 30, for example, Velcro™, may be used to adjustably attach the second end 24 to the strap 21, at various locations, as shown also in FIG. 3, to provide relative differences in the length of the strap 21 necessary to hold the bottle B. Several alternative adjustable attachable assemblies 30 may be used, for example, snaps, buttons, or clips, among others.

As mentioned previously, and as depicted in the drawings, multiple straps 21 may be used. To provide for simultaneous release of the straps 21, a handle assembly, generally indicated by numeral 35, is provided in the present invention. Handle assembly 35 is attached to each respective strap 21, such that, by pulling on the handle 35, the user may simultaneously dislodge the second ends 24 from the straps 21. The handles 35 may generally have any form and be constructed of various members. In the example shown, handle 35 is a single member that spans the axial gap between the straps 21. Handle 35 may be attached to the second ends 24 of straps 21 in any conventional manner including stitching. This feature of the present invention is particularly useful in situations where the jarring motion of the vehicle V makes it difficult to use two hands to release the bottle B. Handle assembly 35 may also be useful in providing a larger graspable surface than the singular ends 24 to aid the user in releasing the straps 21. It will be appreciated that this concept may be extended to embodiments having more than two straps 21.

The bottle bracket 10 may optionally include at least one projection, generally indicated by the numeral 40 to provide additional support for the bottle B or to axially restrain the bottle's movement. In the example shown, projection 40 is a generally planar member that extends at an angle ∝ relative to the body 11. In the example shown, the angle α (FIG. 2) is approximately 90°. It will be appreciated that other angles may be used or the projection 40 may simply protrude without definite angle support the bottom of the bottle B.

An alternative embodiment of a bottle bracket according to the concepts of the present invention is shown in FIGS. 4 and 5 and generally indicated by the numeral 10'. A large portion of the structure of the alternative bottle bracket 10' is identical to the bottle bracket 10 described above and, therefore, like numbers will be used to describe like portions of the bottle bracket 10' with differing structures indicated by a prime (') following the numerical designation. Bottle bracket 10' generally includes a body 11' that defines closed slots 12' for receipt of the securement assembly 15. As will be appreciated, the straps 21 of the securement assembly described above and depicted in FIGS. 4 and 5 would be passed through the slots 12' with a portion of the straps 21 being wrapped around the rear surface 20 of the body 11', such that a portion of the strap 21 is interposed between the body 11' and supporting surface S. As described above, fasteners F pass through fastener receivers 13 and are driven through the strap 21 into supporting surface S to secure the bottle bracket 10' to the vehicle V. The driving of the fasteners F through the strap 21 provides sufficient shock absorption to prevent damage to the bracket body 11'.

In terms of a method, to prevent fracture or other deformation of a bracket (10, 10') constructed of a material that is relatively brittle, the straps used to secure a bottle to the bracket (10, 10') are extended at least partially between the support surface S and the bracket (10, 10'). Then, fasteners F used to attach the bracket (10, 10') to the vehicle V, are driven through the bracket, then the portions of the straps and finally into the surface S.

In light of the foregoing, it should thus be evident that the described apparatus and method of the present invention, providing a bottle bracket, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A bracket for securing a bottle within a vehicle, the bracket comprising:
 a body constructed of a material;
 a strap for securing the bottle to the body, wherein a portion of the strap is located between the body and the vehicle;
 a fastener extending first through said body, then through said portion of said strap, and into the vehicle for attaching the body to the vehicle.

2. The bracket of claim 1, further comprising a second strap axially spaced from said strap, wherein said strap and said second strap are releasably attached to themselves to trap the bottle between said strap and said body; and
 a handle attached to both of said straps.

3. The bracket of claim 2, wherein said body defines a first pair of receivers for receiving said strap, said strap passing through said first receivers; and
 a second pair of receivers for receiving said second strap, wherein said second strap passes through said second receivers.

4. The bracket of claim 1, wherein said body defines a receiver for receiving said strap.

5. The bracket of claim 4, wherein said receiver is a notch opening laterally outward of said body.

6. The bracket of claim 1, wherein said receiver is a slot defined in said body.

7. The bracket of claim 1, wherein said body has a pair of receivers that lie generally in the same horizontal plane;
 wherein said strap passes through both of said receivers.

8. The bracket of claim 1, wherein said body includes a projection extending forward from said body.

9. The bracket of claim 8, wherein said projection is a generally planar member.

10. The bracket of claim 1, wherein said body is constructed of plastic.

11. The bracket of claim 1, wherein said fasteners are screws.

12. A bracket for supporting a bottle within a vehicle, said bracket comprising:

a body attachable to the vehicle;

a first strap and a second strap, each of said straps having ends releasably attached to their respective straps; and a handle attached to both of said straps for releasing both of said straps with a single pull.

13. The bracket of claim 12, wherein said handle is a single member spanning the axial space between said straps.

14. A method of mounting a bracket to a vehicle comprising the steps of:

providing a bracket having a body with a strap for releasably attaching a bottle to the bracket body;

positioning at least a portion of said strap between said body and a surface of the vehicle on which the bracket is to be supported; and driving fasteners through said body, then said strap, and finally into said surface to attach said body to the vehicle.

15. The method of claim 14, further comprising the step of constructing a body of a brittle material.

16. The method of claim 15, wherein the step of constructing the body of a brittle material includes constructing the body of a plastic material.

* * * * *